FIG. I.

INVENTOR.
HAROLD F. WINTERS
BY
ATTORNEYS

Dec. 5, 1967  H. F. WINTERS  3,356,287
METHOD AND APPARATUS FOR ION PUMPING AND PRESSURE MEASUREMENT
Filed July 28, 1965  6 Sheets-Sheet 2

INVENTOR.
HAROLD F. WINTERS
BY
ATTORNEYS

INVENTOR.
HAROLD F. WINTERS

INVENTOR.
HAROLD F. WINTERS
ATTORNEYS

*INVENTOR.*
HAROLD F. WINTERS
BY

ATTORNEYS

United States Patent Office 3,356,287
Patented Dec. 5, 1967

3,356,287
METHOD AND APPARATUS FOR ION PUMPING AND PRESSURE MEASUREMENT
Harold F. Winters, San Jose, Calif., assignor to Granville-Phillips Company, Boulder, Colo., a corporation of Washington
Filed July 28, 1965, Ser. No. 475,344
37 Claims. (Cl. 230—69)

ABSTRACT OF THE DISCLOSURE

A getter-ion pump is disclosed wherein a first electrostatic field is established between a rod-like anode and a coaxially disposed, cylindrical grid surrounding the anode, the anode being positively biased with respect to the grid. A second electrostatic field is established between the grid and a coaxial, cylindrical cathode surrounding the grid, the grid being positively biased with respect to the cathode. Various embodiments of electron injectors are disclosed for introducing electrons into the first field region to thereby ionize gas molecules present in this region. A getter is mounted on the anode and is sublimated by an electron source independent of the above-mentioned electron injector, the getter material being deposited on the inner surface of the cathode. Ions resulting from gas molecule-electron collisions are driven towards the cathode by the first electrostatic fluid. Upon entering the second field, they are accelerated to the cathode and buried in the getter. Thus, an effective getter-ion pump results. The presence of the second electrostatic field also tends to eliminate the passage of electrons to the cathode thereby increasing the total electron path length and permitting the use of the device as a pressure measuring instrument which achieves an accurate detection of the ion flow to the cathode.

---

This invention relates to ion pumping and pressure measurement and, more specifically, to an improved method and apparatus for achieving a long total path length for angular momentum trapped, charged particles in an electrostatic field.

In the past decade, significant advances have been made in the technology of producing low pressures. One of the most important developments has been the "getter-ion pump" which, in many applications, has provde superior to other types such as diffusion pumps or mechanical pumps employing vanes or impellers.

A getter-ion pump, unlike more conventional pumping devices, has no moving parts, contains no fluids such as oil or mercury, and does not eject the pumped gases into the outside atmosphere; but instead, it operates in a manner such that electrons are released from a suitable source and caused to move in a region within the pump until they strike gas molecules with sufficient energy to create ions or are captured on an electrode. The gas ions thus created are accelerated by appropriate electric fields and collide with suitable surfaces where they become buried. Simultaneously, getter material is sputtered, evaporated, or otherwise deposited on certain interior surfaces so that the buried ions are further covered. The fresh deposit of getter material reacts with chemically active gases such as, for example, $O_2$, $N_2$, and $H_2$ without requiring ion formation. The chemical compounds thus formed remain trapped on the interior surfaces of the pump.

The greater the distance that an electron can be made to travel before being captured on an electrode, the greater the probability that it will suffer an ionizing collision with a gas molecule which can then be removed from the system. There have been two distinctly different approaches, each with several modifications, taught in the prior art as a means for producing the long electron path lengths necessary in efficient getter-ion pumping.

The first of these is the so-called "Evaporion" approach exemplified by U.S. Patents 2,850,225, 2,888,189, and 2,894,679, wherein the ionizing electrons are passed back and forth through grids. Even a 95% open grid will intercept essentially all of the electrons after only a few dozen traversals, hence, the resulting electron path is quite short.

The second has become known as the "Sputter-ion" approach (U.S. Patent 2,993,638) which utilizes magnetic and electric fields to confine the electrons. These devices are a great improvement over the "Evaporion" devices because the electrons do not traverse grids, therefore they always circulate in free space. To obtain high pumping speeds, however, multiple cell geometries must be employed and these cells have to be placed between the pole faces of permanent magnets to obtain the required strong magnetic fields. Thus, in these devices, it is difficult and costly to maintain high gas conductance to the cells and still get the cells into the narrow magnet gaps provided by the present-day permanent magnets. In addition, these magnets are costly, bulky, heavy, and produce unwanted stray fields. Because of this tight geometry, it is almost impossible to vaporate getter material uniformly into the discharge volume to enhance pumping or to cover previously buried ions. Sputtering is used in such devices to provide fresh getter material, but, the sputtering must be so intense that it tends to uncover previously buried gas. A third way of producing long electron path lengths was suggested by J. R. Pierce in his book, "Theory and Design of Electron Beams" (Van Nostrand Co. Inc., New York, 1949), pp. 33–34. The author describes the confinement of electrons by the conservation of angular momentum in purely electrostatic fields without the use of grids or magnetic fields. In section 4.2 of Pierce's book, "Radial Electric Fields; Conservation of Angular Momentum," he writes:

"Consider a field in which the potential is a function of radius only. Such a field might be a charge-free field, or it might be one in which there is an appreciable charge due to moving electrons (space charge). As $F_\theta$ is zero in such a field, from $$rF_\theta = \frac{d}{dt}(mr^2\dot\theta)$$

$$r^2\dot\theta = \text{constant}$$

Suppose, for example, electrons leave the interior of a cylindrical cathode with initial velocities (perhaps thermal velocities) and are attracted toward a small cylindrical anode, . . ."

Pierce goes on to show that if the electrons are injected with suitable angular momenta they can be made to miss the central anode.

Elementary energy considerations show that if the electrons emerge from a source at a potential intermediate between the cathode and anode, they will have insufficient energy to reach the cathode. Furthermore, they lack the energy necessary to escape through the ends of the cylindrical diode regardless of whether end caps are provided on the cathode or not. Thus, the electrons are constrained to circulate continuously about the anode until they either strike the electron source from which they emerged or suffer a loss in angular momentum because of field assymetries or because they have collided with a gas molecule. Gas ions thus created are accelerated to the cathode by the radial field where they are captured as in any getter-ion pump.

It thus becomes apparent that the problem of producing an efficient electron trapping device incorporating such as arrangement requires that one devise a method of injecting electrons with a suitable angular momentum and energy and with the electron injection device so placed that it does not appreciably disturb the radial field, and thus allows as many electrons as possible to be trapped.

Prior art U.S. Patent No. 3,118,077, utilizes an electron gun to direct a well defined beam of electrons tangentially into the annular space between the cathode and anode, but, such an arrangement suffers from several serious disadvantages. To begin with, the electrons all emerge from the electron gun with very nearly the same angular momentum and energy and, hence, follow the same path, except for a slight space charge spreading. Also, the entire electron path lies in essentially the same plane, resulting in all of the electrons being concentrated in a very small volume of the device. This produces a space charge build-up which seriously limits the amount of circulating charge which can be stably contained between the anode and cathode. Because the electron gun lies in the plane of the orbiting electrons, they collide with the gun structure after only a few excursions around the anode.

It has now been found that these and other problems can be eliminated in accordance with the teaching of the present invention by injecting the electrons into the annular space between the cathode and anode so that their paths essentially fill the space and so that they are urged axially away from the emitting source structure. The electrons are all injected with essentially the same energy but with a continuous range of angular momenta ranging from values so large that some electrons just miss collision with the cathode to values so small that a few electrons immediately collide with the anode. In addition, the electrons are injected into a region of the electrostatic field where an axial component of the field exists. Such an axial field component is present in the region where the anode is terminated short of the cathode or where an end cap covers the end of the cathode. Electrons thus injected tend to orbit about the anode in an infinite number of distinct paths. With each electron acquiring an axial component of velocity, these electrons tend to follow rosette-shaped helical orbits away from the emitter source. Hence, with the correct adjustment of the axial velocity component, the injected electrons just miss the injector structure and orbit about the anode as they drift slowly therealong. At the opposite end of the device from the emitter, the field remains cylindrically symmetric and the electrons are reflected without net change in their angular momentum about the anode and drift back along said anode toward the emitter. Having returned again to the emitter end of the unit, some electrons will make another similar traverse of the field region. In this way the average path length for an electron can be made hundreds or thousands of times longer than the path lengths generated in the prior art devices and the quantity of circulating charge approaches the theoretical maximum, i.e. the charge on the cylindrical capacitor represented by the anode-cathode assembly.

Also, according to the teaching of the instant invention, an open grid electrode is placed between the cathode and anode, concentric with the anode, and held at a potential intermediate between said anode and cathode. The electrons are injected into the annular space between the grid electrode and anode with an energy and angular momentum distribution selected such that the electrons are trapped and constrained to orbit about the anode. Obviously, the open grid electrode now functions in the same manner as the cathode in the previously described diode structure as far as the orbiting electrons are concerned. The orbiting electrons travel through very long paths and are quite effective in exciting or ionizing gas molecules that are present between the anode and grid electrode. The positive ions created in this manner are accelerated radially out of the grid-anode region by the electrostatic field. In addition, they are further accelerated by the electrostatic field between the grid and cathode to the cathode where they are buried. The cathode is made of a gettering material such as titanium, or, preferably, is fabricated from a metal like stainless steel onto which is continuously or intermittently evaporated a coating of getter material.

In the diode structure without the grid, ions formed far from the anode acquire insufficient energy to bury themselves in the cathode; however, in the triode device, all of the ions produced in the grid-anode region can be accelerated to sufficiently high energy to bury themselves in the cathode.

Another advantage is realized through the use of the triode configuration. It has been determined experimentally that the electron space-charge around the anode is unstable at electron densities where operation of the device is efficient. Some electrons are, therefore, able to acquire sufficient additional energy from space-charge oscillations, collisions, or otherwise to escape to the cathode in the diode device. Thus, the current to the cathode is composed of both ions and electrons and this net current is not a measure of the gas pressure alone in the diode structure. In the triode device, on the other hand, any electrons which leave the grid-anode region are turned back by the electrostatic field between the grid and the cathode; therefore, the current to the cathode is composed solely of positive ions and this current value becomes a true measure of the pressure in the grid-anode region, thus enabling the pump to measure the gas pressure within it.

Still another advantage is realized through the use of the triode configuration. By placing the grid closer to the anode, the grid-anode capacitance is increased with a resulting increase in the electrical charge stored on the grid-anode capacitor. Hence, the amount of possible circulating electron charge is increased with a resulting increase in the amount of ion production. This result can be achieved without decreasing the cross-section of the cathode and hence without reducing the gas conductance into the cathode.

It is, therefore, the principal object of the present invention to provide a novel and improved method and apparatus for greatly increasing the total distance and time interval that most electrons travel before striking an electrode, the foregoing being accomplished by trapping said electrons in purely electrostatic fields established between an elongate centrally-located anode carrying a positive charge and a second electrode charged negatively with respect to the anode positioned in cylindrically concentric relation to the latter.

A second objective of the invention herein disclosed and claimed is to provide an electrostatic field configuration enveloping the anode that is designed to conserve the angular momentum developed in the electrons throughout a large portion of their total path.

Another object of the instant invention is the provision of apparatus capable of introducing electrons into the region surrounding the anode with sufficient angular momentum to carry them past the latter, yet, with too little energy to reach the negative electrode and, at he same time, imparting to these same electrons an axial component of velocity which will cause them to migrate along the anode.

Still another object of the invention forming the subject matter hereof is to provide a device of the character above-described that includes an open cylindrical grid surrounding the anode, means for accelerating the ions radially away from the anode and through the grid, and means for further accelerating the positive ions outside the grid.

Yet another objective is the provision of a triode ion pump configuration that has an anode, an open grid electrode surrounding the anode in cylindrically concentric relation to the latter, and a cathode substantially enveloping the intermediate grid electrode, the cathode or third electrode providing means capable of preferentially attracting positive ions and, preferably, burying them in its surface.

An additional object is to produce a novel and improved getter-ion pump that makes use of the triode configuration described above in conjunction with a source of getter material that coats the interior exposed surfaces of the outermost electrode on either an intermittent or continuous basis to provide a collector for the ions that have been accelerated through the grid to the cathode, said cathode surface being sufficiently large and so prepared that the getter material will not peel off.

A further object is to provide a means for evaporating getter material by mounting the bulk getter material on the anode and bombarding it with electrons accelerated to the anode.

Still a further object is to utilize the triode configuration as a pressure gauge by applying sufficient bias between the grid and cathode to prevent electrons from reaching the latter even though the grid-anode volume is saturated, and adding means for measuring the current to the cathode which, because it is formed almost entirely of positive ions, provides a close measure of the gas pressure.

Other objects of the present invention are to provide an ion-pumping apparatus that includes cylindrically symmetric end terminations which function to reflect the electrons with no net change in their angular momentum, an electron injector located to cause minimal disturbance in the symmetric potential distribution between the grid and anode while introducing the electrons into rosette-shaped helical orbits designed to miss the injector on their initial excursion around the anode, and an overall improved geometry wherein a number of factors cooperate to provide a many-fold increase in ion-pumping speeds without sacrificing active-gas pumping speed.

Still other objects will be in part apparent and in part pointed out specifically hereinafter in connection with the description of the drawings that follows, and in which:

FIGURE 1 is a vertical diametrical section showing the improved ion-pumping apparatus of the present invention incorporating the novel triode design;

Figure 2:
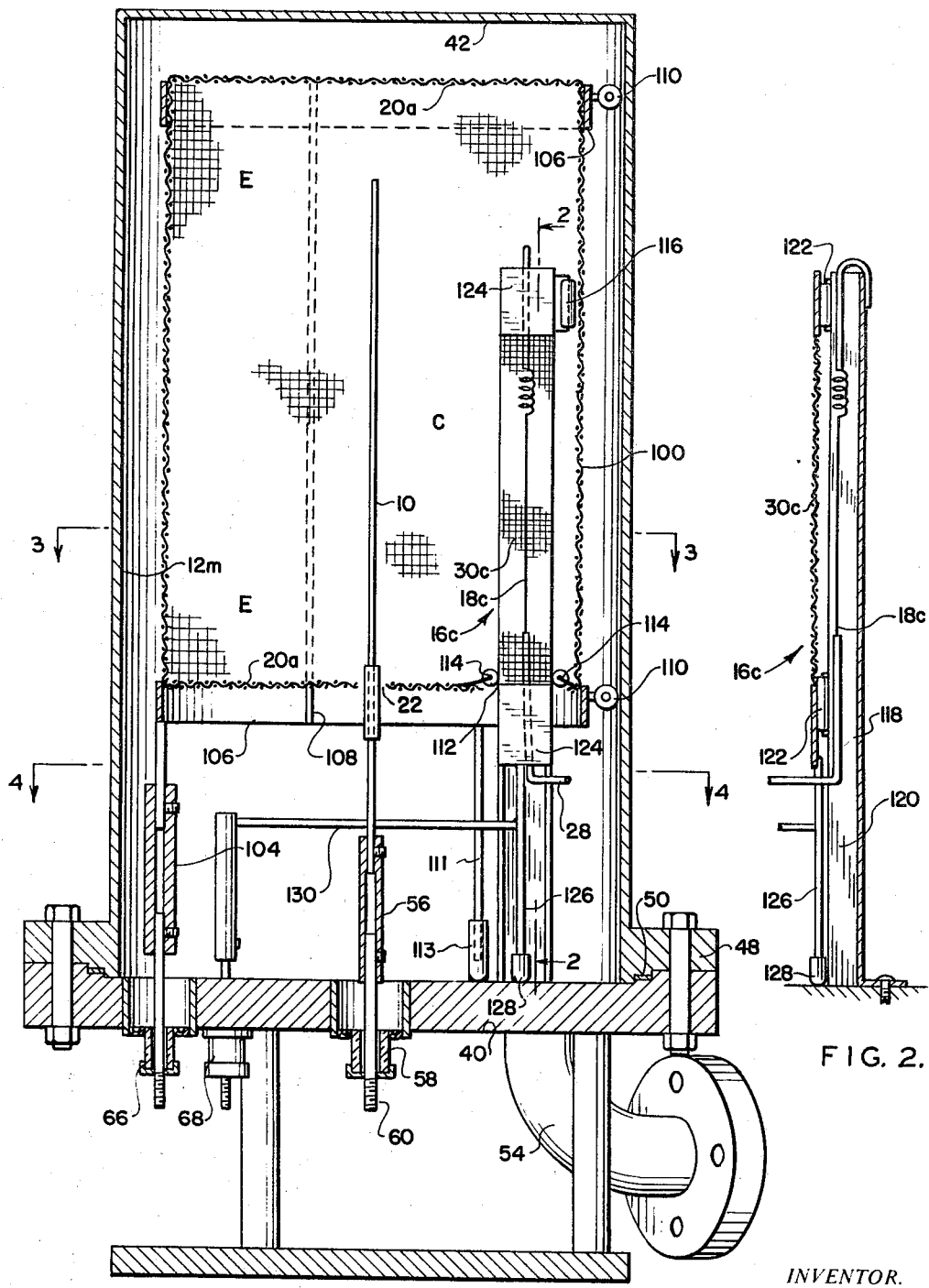
FIGURE 2 is fragmentary section taken along line 2—2 of FIGURE 1 showing the details of the electron injector.
Figure 3:
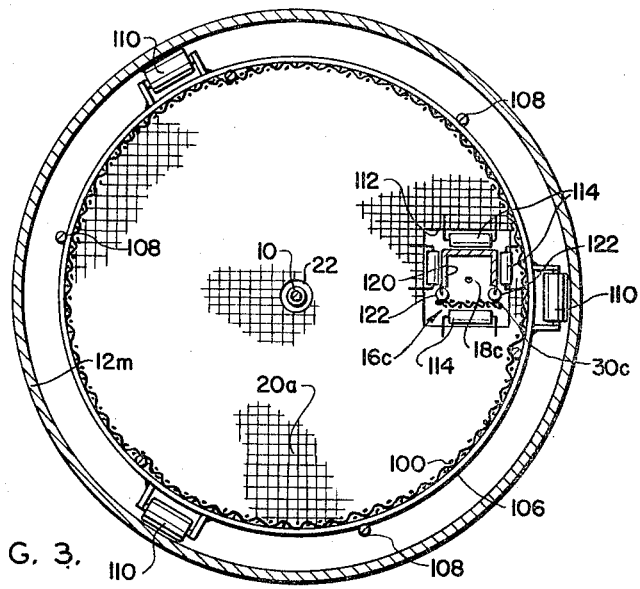
FIGURE 3 is a horizontal section taken along line 3—3 of FIGURE 1.

Referring now to the drawings for a detailed description of the present invention and, initially, to FIGURES 5, 8, 11, 12, 14, and 15, it will be seen that all of the structures include an elongate rod-like electrode 10 mounted coaxially within a second hollow cylindrical electrode 12. Electrode 10 functions as an anode in each of the several different embodiments illustrated and a positive potential is impressed thereon as indicated in the schematic electrical diagram of FIGURE 10.

Electrode 12, on the other hand, is biased negatively with respect to the anode 10 and, for purposes of the present description, will henceforth be referred to as the "cathode."

Now, anode 10 and cathode 12 cooperate with one another to develop a purely electrostatic field therebetween which, in what will be defined herein as its "central zone," is substantially radial meaning that the force field includes no significant axial component. This so-called "central zone" wherein the electrostatic forces are essentially radial and equal at all corresponding radii exists in all the configurations shown at the mid-point of the anode and for some distance on either side thereof because of the elongate nature of the anode 10. On the other hand, adjacent the ends of the electrostatic field defined between these electrodes, the force field is not all radial, but instead, includes a substantial axial force component which functions in accordance with the teaching of the instant invention to cause electrons introduced into either of these so-called "end zones" to be accelerated axially along the anode thus resulting in their acquiring an axial component of velocity up and down the anode. The orbital path followed by the electrons about the anode is a "rosette-shaped" path stretched out along the anode much in the form of a distorted helix.

The principles relating to conservation of angular momentum of a charged particle moving in a cylindrically symmetric electrostatic field are well-known in the prior art as previously mentioned. As aforesaid, it is only necessary to introduce these electrons into the electrostatic field from an emitting surface whose potential is intermediate between the anode 10 and cathode 12 to insure that they will have insufficient energy to reach the cathode. The other prior art requirement is that the charged particles be injected into the electrostatic field with sufficient angular momentum about the anode 10 to carry them past the anode. To accomplish the latter, the prior art teaches the use of an electron gun capable of focusing the electrons emitted therefrom into a well directed beam. The gun is then located within the electrostatic field in a position such that the electrons are injected tangentially with respect to a surface of revolution developed around the anode as its axis. Significantly, the prior art requires that the gun be located in a portion of the electrostatic field where the forces are essentially all radially-directed and, furthermore, the gun's axis lies in a plane normal to the anode so that the electrons orbit in paths which, likewise, are normal to the anode.

The net result of such a system of electron injection is to produce relatively short path lengths for several reasons. First of all, saturation quickly develops in the portion of the electrostatic field where the gun is located, whereas, the portions of the field bordering this saturated volume contain only those electrons which have been scattered in collisions or deflected there by electron space charge repulsion. Secondly, practically all the electrons move in a planar orbit which plane contains the electron gun, and after one or more orbits about the anode the electrons collide with the electron gun.

Figures 5, 6, 7:
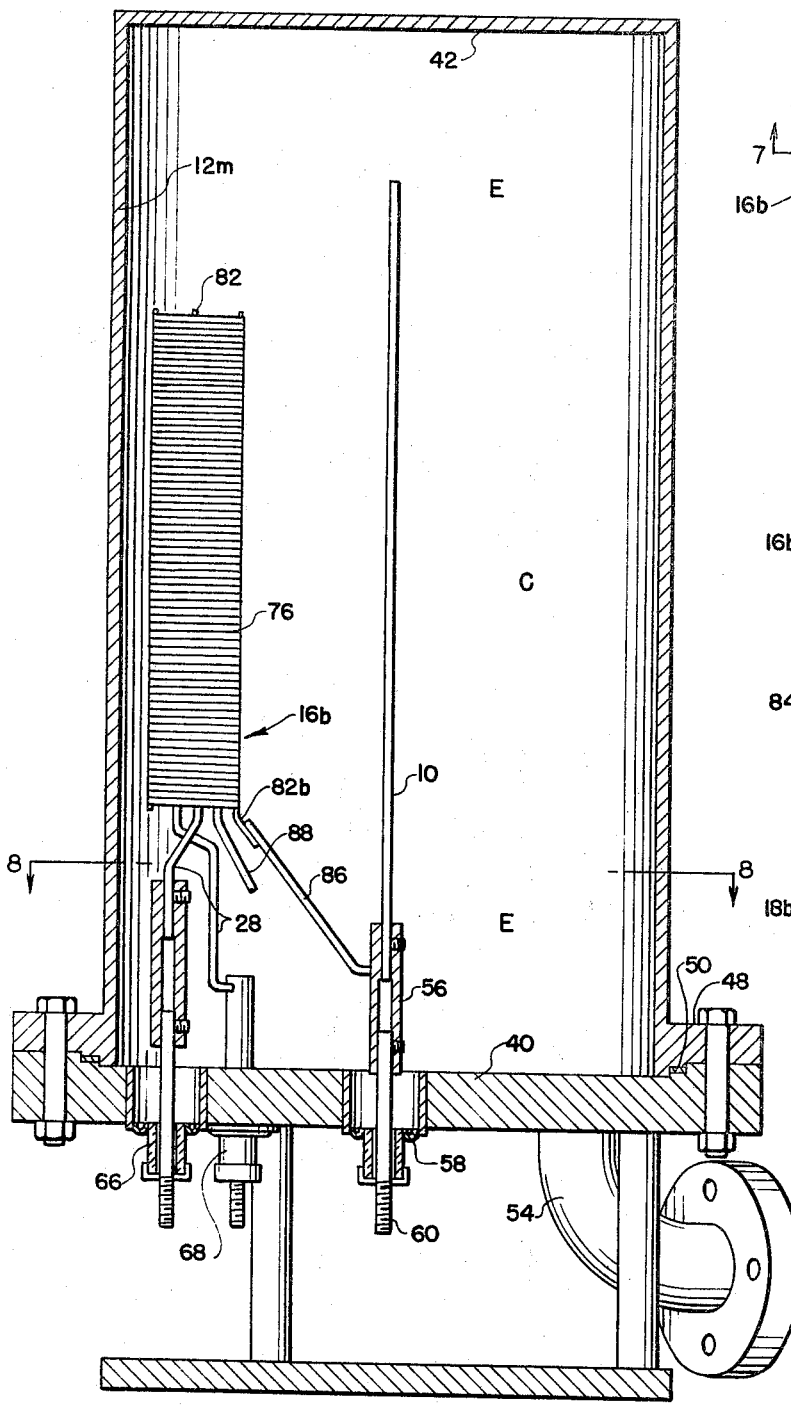
FIGURE 5 is a vertical diametrical section similar to FIGURE 1 but showing a somewhat simplified diode configuration with a modified injection device that includes a shielded filament which prevents electrons issuing from the emitter from migrating directly to the anode.
FIGURE 6 is a top plan view of the injector structure of FIGURE 5 revealing the location of the shield in relation to the filament and also the concentric grids surrounding the latter.
FIGURE 7 is a diametrical section taken along line 7—7 of FIGURE 6 showing further details of the injector.
Figure 8:
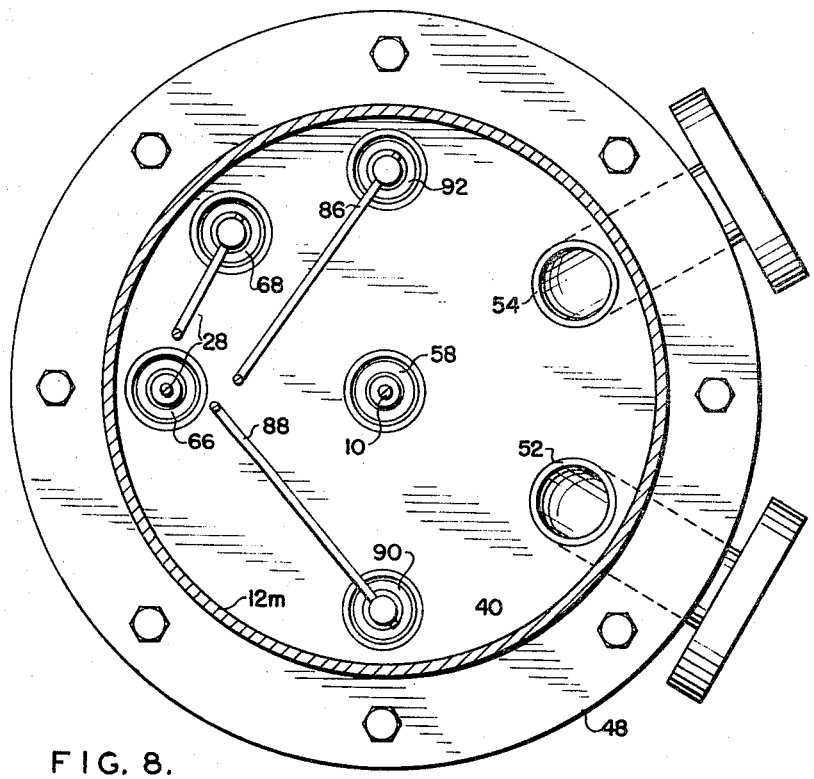
FIGURE 8 is a horizontal section taken along line 8—8 of FIGURE 5.

It has previously been mentioned that one of the prime objectives of the instant invention is to provide a novel method and apparatus for producing maximum path lengths and it has been discovered that the teachings of the prior art as set forth above result in foreshortened rather than lengthened orbital paths. A prime requirement for lengthening the orbital paths followed by the electrons is to provide them with a substantial axial component of velocity. The simplest way of accomplishing this desirable end, directly contrary to the teaching of the prior art, is to locate the injector at a point in the electrostatic field where a substantial axial force component is already present, namely, in one of the "end zones" rather than the central zone and to inject the electrons into a great variety of orbits rather than in a well focused stream or beam. In each of the physical embodiments illustrated in FIGURES 1, 5, 11 and 14, the electron injection apparatus which has been broadly designated by reference numeral 16 will be seen to have a substantial portion, and in some instances all, of the filament 18 displaced axially along the anode so that the electrons will be emitted therefrom into a region or zone of the electrostatic field where a substantialy axial force component is present. These axially-directed components of the electrostatic field are large adjacent the axial extremeties thereof and are zero at or near the center. Accordingly, electons injected from the lower end of filament 18 in FIGURE 5 will spiral upwardly along the anode following a path having a greater "pitch" or inclination relative to a plane normal to the anode than those injected near the top where the force field is primarily radial. Thus, with an axially elongated filament such as shown in FIGURES 5 and 7 where portions thereof lie in the "central zone" as well as one of the "end zones," the electrons follows a wide variety of rosette-shaped helical orbits along the anode, some having rather tight or compressed paths while others are stretched out and open. The result is that the entire electrostatic field generated between the electrodes becomes filled with orbiting electrons which migrate in "rosette-type" paths up and down the anode until they strike the injector mechanism or, preferably, a gas molecule with sufficient energy to ionize same.

Perhaps the simplest apparatus illustrating the fundamentals set forth above is that shown in FIGURES 14, 15 and 16 to which specific reference will now be made. The anode 10 comprises a simple elongated metal rod mounted axially inside a cylindrical metal can 12 that serves as the cathode. In the particular form shown, the ends of the can are closed by circular endplates 20 that include a central opening 22 through which the anode passes.

A flap 24 is released from the cylindrical can wall adjacent the bottom endplate 20 to produce an opening for the injector assembly 16 that communicates the interior thereof. As illustrated, the injector comprises a holder 26 that carries electrical leads 28 which supply current to the resistance-heated filament 18 that projects into the can through the open flap 24. Mounted ahead of the filament is an accelerating grid 30 in the form of a shallow cup with a central opening 32. Grid 30 is biased by means of lead 34 to draw electrons from the heated filament and impart sufficient angular momentum thereto such that the vast majority thereof pass on by the anode without striking it on their initial orbit while, at the same time, having insufficient energy to move out to the cathode. The filament to grid spacing and potential difference is chosen to spray electrons in a wide cone out of the injector. The particular potentials needed at the accelerating grid 30 to accomplish the above ends vary with the potentials impressed upon the anode and cathode, the relative positions of the electrodes and injector assembly, and certain other factors, all of which are known in the art and needn't, for this reason, be discussed in detail.

The specific injector assembly just described sprays electrons out in a wide cone. Even those electrons emitted in a plane normal to the anode will not, as in the prior art units, orbit in planes normal to the anode, but rather, begin immediately to orbit upwardly due to the substantial axially-directed force component present in the electrostatic field in the end zone E thereof. It is important to note that in this particular configuration the axial component of the electrostatic field is alone responsible for the spiralling orbital paths followed by the electrons and that no axial directivity is imparted thereto by inclining the injector so as to start the electrons out on an upwardly spiralling generally helicoidal path.

Note also that with the electrons being injected with insufficient energy to reach the cathode 12, there is very little change of even those electrons orbiting quite close to the cathode surface striking the injector assembly because only the accelerating grid 30 is in position to be struck and all other elements of the injector assembly are located outside the cylindrical surface constituting the cathode. None of the electrons will follow orbits normal to the anode such that they could impinge upon the injector before completing even a single orbit but many will pass in close proximity to the injector after having orbited the anode many times and moved up to the top and back down once again.

The distorted helical orbits followed by the electrons are, as previously mentioned, rosette-shaped rather than circular as they could appear if they could be seen looking down into the top of the unit. From the side, on the other hand, they would start out in lower end zone E with their orbits spaced rather close together axially but moving progressively further apart as they approach central zone C where the electrostatic forces are primarily radial. In this cental zone C the electrons will travel in orbital paths of essentially constant pitch because in central zone C there are essentially no axial forces to accelerate or decelerate the electron axially. Thus the electrons traverse central zone C with essentially constant axial velocity and finally arrive at the upper end zone E. In the upper end zone E, they, once again, are acted upon by the axial force component that reverses their direction of movement along the anode.

It is desirable at this time to discuss the end configurations which are necessary to produce the required axial electrostatic force components that turn the electrons back into orbits along the anode without letting them escape. If the anode is terminated sufficiently short of the open end of the cathode then the electrostatic field has an axial component which prevents electrons from escaping through the open end of the cathode. If the anode terminates near or beyond the end of the cathode, symmetrical end caps are desirable to maintain a cylindrically symmetric end field and to produce an axial retarding field which will prevent electrons from escaping. In the apparatus illustrated in FIGURES 14, 15 and 16, flat circular disks are used at the ends of the cathode can and these work quite well to deflect the electrons back into the prime force field existing in the annular space between the electrodes.

Figure 11:
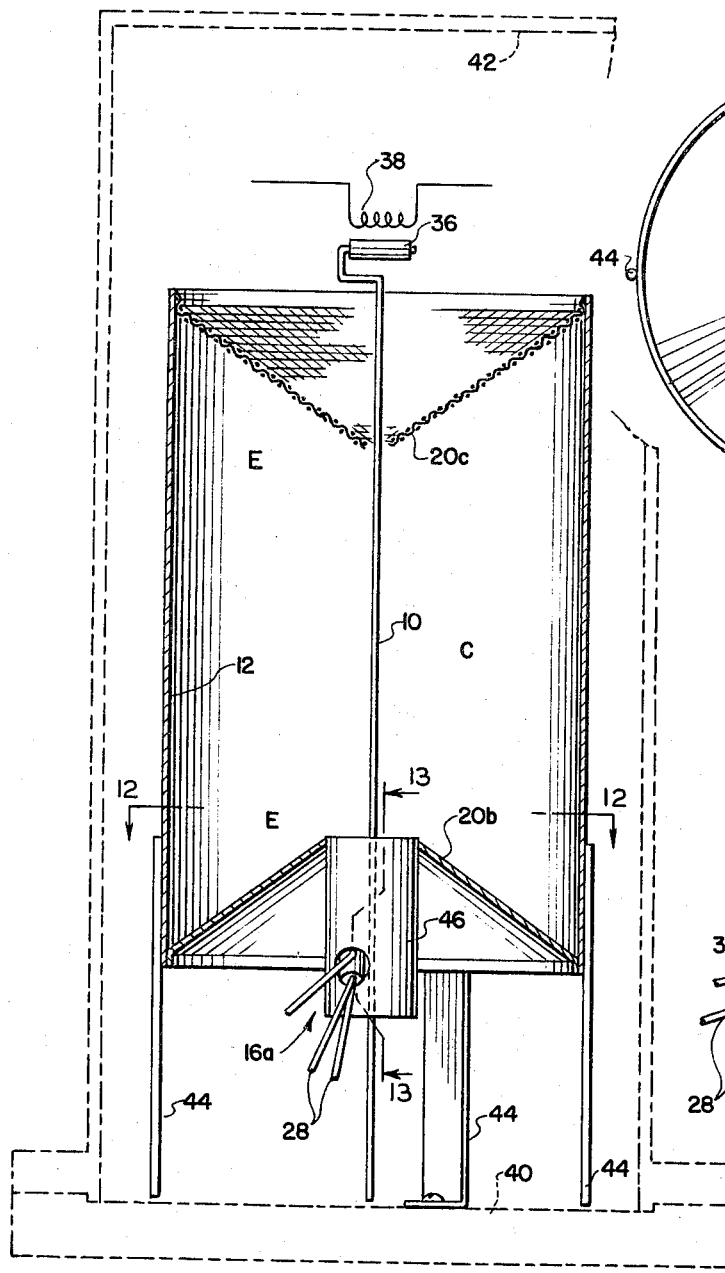
FIGURE 11 is a diametrical section of a further modified diode structure wherein the injection device is located near the anode at the extreme end of the cylindrical region into which the electrons are introduced and the opposite end is provided with means for introducing getter material into the apparatus through electron bombardment of a getter substance carried on the anode.

The apparatus of FIGURE 11 uses two different types of endplates 20b and 20c. One (20b) is solid while the other (20c) is of the mesh type. Actually, open meshed endplate 20c is used in this embodiment to provide a means capable of passing the gettering material evaporated from source 36 thereof onto the interior exposed surfaces of the cathode 12. Endplates 20b and 20c are shaped to provide right-conical surfaces rather than flat ones. Here again, they function quite well to deflect the orbiting electrons back along the anode because both are symmetrical.

The remaining end configuration that needs to be described is that of FIGURE 5 wherein the top endplate is eliminated altogether. The top 42 of the bell jar in this particular piece of apparatus could be removed without appreciably changing the motion of the electrons. The force patterns that are developed at the top end of the electrode are quite adequate to deflect the electrons back along the anode without any mechanical deflector being required. The baseplate 40 serves to turn back electrons at the lower end of the anode. It can be said, therefore, that if the anode is terminated short of the end of the cathode, no deflectors are necessary on the ends of the electrodes to develop the axial force components required to cause the electrons to follow generally helical orbits up and down the anode; however, if such deflectors are employed, they must be symmetrical about the anode as their reference axis so as not to introduce assymetries into the electrostatic field.

Before leaving the apparatus of FIGURES 14–16, it should be mentioned that this assembly is designed to be placed in a vacuum vessel of the general type shown in FIGURES 1 and 5 and which will be described in detail presently. Legs 44 support the unit on the baseplate 40 of the vacuum vessel and the appropriate electrical connections are made to connectors provided for this purpose in the base.

Figure 12:
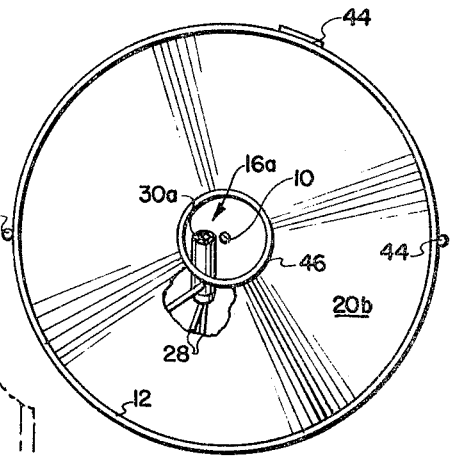
FIGURE 12 is a transverse section taken along line 12—12 of FIGURE 11.
Figure 13:
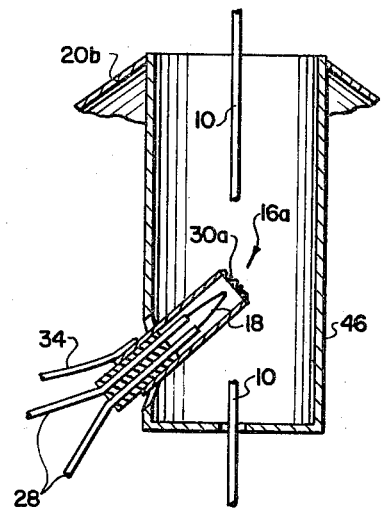
FIGURE 13 is an enlarged fragmentary section taken along line 13—13 of FIGURE 11 showing the particular injector construction.
Figure 14:
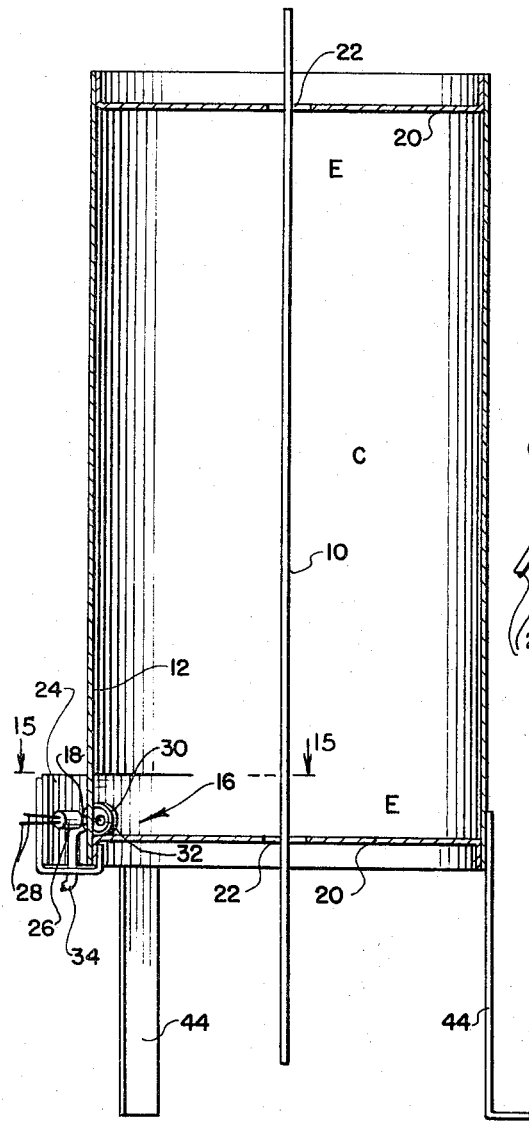
FIGURE 14 is a vertical diametrical section of a still further modified diode structure wherein the injector is moved out onto the periphery of the cylindrical region into which the electrons are introduced and trapped in an electrostatic field.
Figure 15:
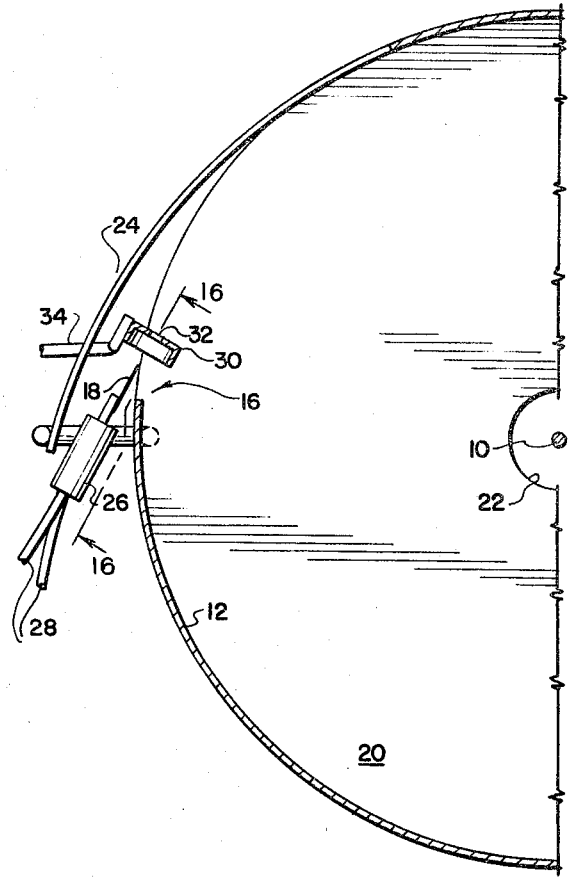
FIGURE 15 is an enlarged fragmentary half-section taken along line 15—15 of FIGURE 14; and, FIGURE 16 is a fragmentary section taken along line 16—16 of FIGURE 15 showing the injector details.
Figure 16:
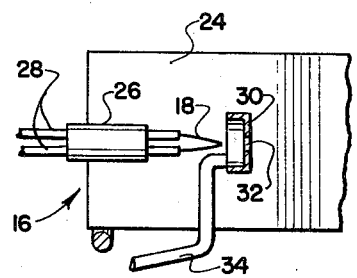

Next, the attention is directed to the embodiment of FIGURES 11, 12 and 13 which includes a few features not present in the device of FIGURES 14–16. The conical endplate configuration 20b and 20c has already been discussed in sufficient detail and need not be elaborated upon. The bulk getter material 36 is mounted on the anode 10 and bombarded with electrons from a heated filament 38 maintained at cathode potential. By controlling the heating power input to the filament 38, the electron current to the getter material 36 can be accurately controlled and thus the evaporation of the getter can be accurately controlled. By mounting the bulk getter material directly on the anode, additional high voltage leads or supports are not required for evaporation of the getter material. Also such a mount provides a central location for the getter material so that the interior of the cathode is reasonably uniformly coated with evaporated getter material. It should be mentioned that while only FIGURE 11 shows a source of getter material and a source of electrons to bombard the latter and continuously or intermittently coat the cathode surface, all of the other pump mechanisms would also be provided with a similar system for applying a uniform coating of getter material onto all exposed interior surfaces of the cathode. Obviously, as in FIGURE 11, the source of gettering material must be located relative to the surfaces it is to coat such that a minimum of "shadowing" occurs due to the presence of other components that will intercept the evaporated material before it reaches the walls that must be coated therewith.

Another difference between the embodiments of FIGURES 14–16 and 11–13 lie in the injector apparatus 16. Injector 16a of FIGURES 11–13 is located much closer to the anode than to the cathode, the opposite having been true of injector 16 in FIGURES 14–16. Injector 16a like 16, however, is positioned at the extreme lower extremity of the apparatus and, in actuality, is located completely outside the main electrostatic field generated between the anode and cathode. Specifically, the injector is housed inside a small cylindrical can 46 that surrounds the lower end of the anode rod 10 in coaxial relation thereto and is fastened to the underside of solid conical endplate 20b. This can is open at the top so that the electrons issuing from filament 18 can spiral up that portion of the anode surrounded by this housing before emerging into the lower end zone E of the electrostatic field where a substantial axial component is present. As before, the filament 18 is connected to electrical leads 28 which supply current thereto and an accelerating grid 30a (FIGURE 13) connected to lead 34 is biased to draw the electrons from the filament and impart sufficient angular momentum thereto so that they will miss the anode on their first pass yet be unable to reach the cathode. As before, the accelerating grid is positioned to start the electrons out on a path designed to by-pass the anode. Here again the injector permits a broad cone of electrons to be injected into the region between the anode and the small can portion of the cathode 46. In other words, grid 30a allows the electrons drawn therethrough from filament 18 to spray out so that relatively few start out on truly tangential orbits; yet, given sufficient angular momenta, even though some are moving away from the anode and others toward it, relatively few will migrate directly thereto upon leaving the injector. Thus, injector 16a exemplifies the fact that the high degree of directivity and tangential injection called for by the prior art is, in fact, unnecessary provided each electron is injected with the required angular momentum to swing past the anode without striking it.

In this particular embodiment, once the electrons escape through the open upper end of can 46, they are free to orbit up and down the anode between the endplates 20b and 20c without any danger of striking an obstruction other than a gas molecule because there is no hardware located within the electrostatic field other than the electrodes between which it is generated and the endcaps. The lower endplate 20b will, of course, effectively reflect most electrons tending to enter can 46 through the top.

One other feature of injector 16a deserves special mention and that is the upward inclination thereof which imparts an initial axial component of velocity to the electrons before they enter the electrostatic field. Injector 16 of FIGURES 14–16 was solely dependent upon the axial component of the field which exists in the end zones E to start the electrons spiralling upwardly along the anode. In FIGURE 11, on the other hand, the axially-directed forces imparted to the electron by the upward tilt of the injector and the axial component of the field are additive which fact further insures their being able to drift upward through the central zone C to upper end zone E.

As before, the apparatus of FIGURE 11 is intended to be mounted and used in a vacuum vessel of the general type shown in FIGURES 1 and 5. Such a vessel has been indicated in dotted lines.

Figure 4:
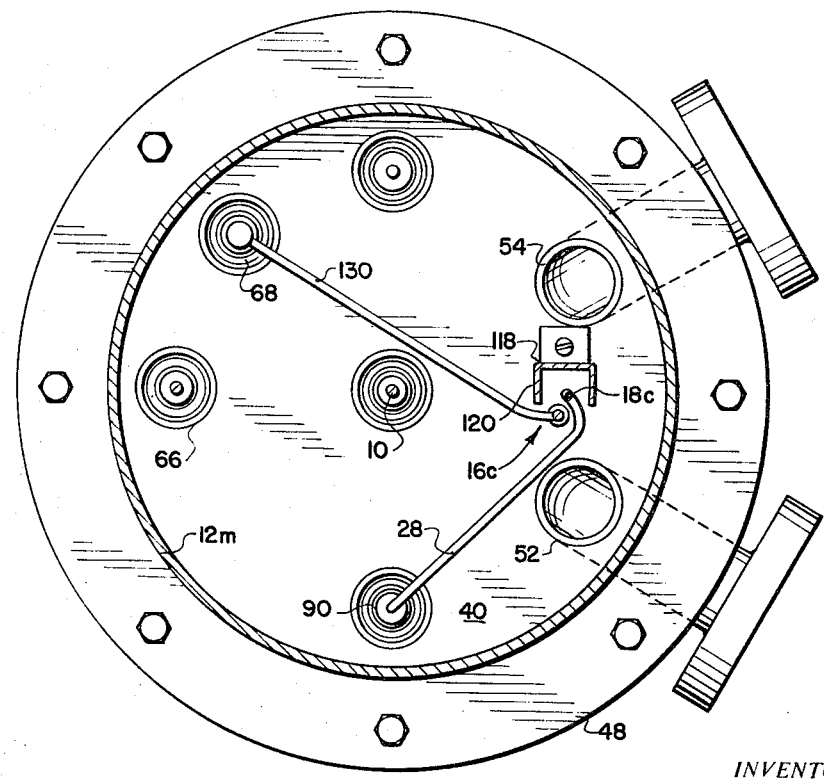
FIGURE 4 is a horizontal section taken along line 4—4 of FIGURE 1.

Next, with specific reference to FIGURES 5–8 and 10, a somewhat different version of an ion pump incorporating the above-described principles will be set forth in detail. Here the metal bell jar 42 constitutes the cathode 12m instead of a separate hollow cylindrical can adapted for insertion into the vacuum vessel as was the case with the previously described embodiments. The bell jar 42 has a cylindrical shape as shown and is bordered along its lower edge by an external flange 48 that bolts to baseplate 40 with a gasket 50 therebetween to produce an air-tight vessel. As is revealed most clearly in FIGURES 4 and 8, the baseplate 40 is provided with two conduits 52 and 54 that communicate with the interior of the vacuum vessel. One of these conduits is connected to the system containing the gas to be removed while the other can be connected to a gauge capable of measuring the pressure in the system. Actually, partial evacuation of the system is usually accomplished initially by a small mechanical pump (not shown) which is then sealed off from the system while further pumping is accomplished by means of the ion pump.

The particular vacuum vessel shown in FIGURES 1, 4, 5 and 8 was designed primarily for testing different designs, such as those of FIGURES 11 and 14, which could merely be placed inside and wired to appropriate terminals. In these tests, conduits 52 and 54 provided the necessary means for the initial "pump-down" of the apparatus and subsequent evaluation of its efficiency. The gas conductivity of such a unit, however leaves much to be desired and, for this reason, would seldom be incorporated into an actual high-vacuum or ultra-high vacuum system. Instead, conduits 52 and 54 would be removed from the base and the top left completely open with a flange bordering same that could be connected into the system in vacuum-tight relation. The pumping capacity of the system would thus be increased many times and not be restricted by the volume of gas that could pass through the small diameter conduits 52 and 54. Of course, vacuum vessels designed to provide high conductance of the type aforementioned are well known in the art, and it is to be understood that they would be employed to the exclusion of those vaccum vessels illustrated.

Figure 10:
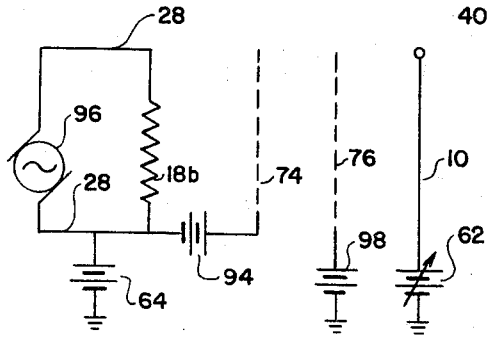
FIGURE 10 is an electrical schematic of the apparatus of FIGURES 5–8.

Anode 10 is fastened in coaxial relation to the cathode 12m by connector 56 which also fastens to an insulated air-tight electrical mounting post assembly 58 fastened centrally within the baseplate 40 and providing an exterior conductor 60 by means of which a positive bias can be applied to the anode through variable D.C. power supply 62 (FIGURE 10).

The noteworthy differences in the apparatus of FIGURES 5–8 are to be found in the injector assembly 16b. Here, filament 18b (FIGURE 7) comprises an elongate straight wire stretched vertically between the free ends of electrical leads 28 which, as before, supply bias potential and power thereto from outside D.C. power supply 64 and source 96 (FIGURE 10). Leads 28 enter the vacuum vessel through other insulated vacuum-tight electrical posts 66 and 68 having structures identical to post 58 that carries the bias current to the anode. One of the leads 28 has a reversely-bent end portion 70 at its upper extremity to which the filament 18b is attached and the other lead fastens to the bottom of the filament. It is most important to note that filament 18b provides omnidirectional emissions, whereas, the previously-described filaments 18 (FIGURES 11–16) were at least somewhat directional due to the placement and construction of the accelerating grids 30 and 30a. The use of an omni-directional injector assembly means, of course, that some of the electrons emitted thereby will migrate directly to the anode because, regardless of their energy, they will have been released with insufficient angular momentum to miss the anode. When this occurs, the anode will intercept these electrons after they have traveled through only very short paths. Thus, they are not effective in producing ions. These electrons also bombard the anode, heating it and causing it to outgas, which is undesirable. These nonproductive electrons also contribute to the electron space charge between the anode and cathode and prevent useful electrons from being injected.

Accordingly, it becomes important to shield the anode from the action of those electrons which otherwise would migrate directly thereto. Such a shield has been shown at 72 in FIGURE 7 located between the filaments and anode. That is, the support wire for the upper end of the filament is interposed directly between the anode 10 and filament 18b so that emitted electrons cannot travel directly to the anode.

As was true of the other injectors, the filament 18b has a considerable portion at the lower end thereof displaced axially from the central zone C of the electrostatic field such that it lies in the lower end zone E where a substantial axial force component exists that will deflect the electrons upwardly into distorted helical orbits. Obviously, the axially-directed component acting upon the electrons issuing from the filament 18b can be rendered more effective by merely lowering the injector assembly 16b relative to the anode 10 so as to place more or all of the filament in one of the end zones E.

The injector assembly is located in close proximity to the cathode-forming cylindrical wall of the bell jar. The filament 18b in this particular injector assembly is surrounded by two coaxial tubular accelerating grids 74 and 76. The inner accelerating grid 74 is substantially coextensive in length with the filament 18b and, as shown, is eccentric with respect thereto. The larger of the two grids 76 is also longer and, as aforesaid, is arranged coaxially with respect to the smaller grid. It is not necessary for the grids to be of different length nor is it necessary for them to be as long as shown.

Both of these grids 74 and 76 are formed by spot welding endless wire helixes 78 and 80 to the four rod-like supporting members 82 and 84. One of the supports (82b and 84b) of each set of four thereof are connected through leads 86 and 88 (FIGURE 7) and through insulated posts 90 and 92 (FIGURE 8) in the baseplate to an exterior source of direct current. Specifically, as seen in the circuit diagram of FIGURE 10, small grid 74 is connected to receive a positive bias from D.C. source 94, the negative side of which is connected to filament circuit 28 powered by grounded D.C. source 64 and A.C. generator 96. More specifically, as shown in FIGURE 10, grid 74 is biased positively with respect to filament 18b by virtue of D.C. source 94 and filament 18b is biased positively with respect to ground potential by virtue of D.C. source 64. As shown, the filament is powered by generator 96 which is connected serially therewith and is connected to the juncture of the positive and negative terminals, respectively, of D.C. sources 64 and 94. Large grid 76, on the other hand, is biased positively with respect to ground by D.C. source 98.

Specifically, the potential of outer grid 76 is adjusted so that the grid 76 is generally somewhat above the local potential in its vicinity. Most electrons emerging from grid 76 thus encounter a potential gradient which has a substantial $\theta$-directed or transverse component. As the electrons move down this potential gradient, they acquire a considerable angular momentum which enables them to orbit about the anode for a considerable time before being captured thereby. The potential of grid 74 and of filament 18b is adjusted to give a suitable electron emission current and energy.

Now, from an inspection of the apparatus of FIGURE 5 it would appear that the large injector structure 16b located within the electrostatic field would introduce substantial asymmetries therein and, most important, provide structures which would intercept many of the orbiting electrons and thus effectively reduce the average path length traveled by the electrons. Despite the seeming deficiencies in such an arrangement, it proved to be an excellent piece of equipment and far exceeded the results predicted therefor. For instance, with 3000 volts impressed upon the anode and at a pressure of $5 \times 10^{-6}$ Torr, an average electron path of 710 cm. was obtained. At a pressure of $1 \times 10^{-4}$ Torr, the average path length was increased to 1110 cm., the latter figure representing an average path length several hundred times greater than it is possible to achieve in a Bayard-Alpert gauge tube.

If we define $\gamma$ as the product of the path length and the electron current, we have a direct measure of the ion forming ability of the device. With an emission of 5 ma. at $5 \times 10^{-6}$ Torr, $\gamma = 3550$ ma. cm.; and, at $p = 1 \times 10^{-4}$, $\gamma = 5550$ ma. cm. These, of course, are extremely large values for $\gamma$.

The most elaborate of the several embodiments is that which has been illustrated in FIGURES 1–4 and 9 which will now be described. Actually, the apparatus of FIGURES 5–8 proved to be the most effective of those shown in maximizing the value of $\gamma$, the one illustrated in FIGURE 1 producing an average path length of around 500 cm. and a $\gamma$ of 720 ma. cm. at $5 \times 10^{-6}$ Torr.

There remain, however, a number of other significant improvements incorporated into the FIGURE 1 apparatus that are not present in the other embodiments. Note that, once again, the bell jar 42 of the vacuum vessel functions as the cathode 12m, an anode 10 is located on the axis defined by the cylindrical wall of the bell jar, and electron injection assembly 16c containing an axially displaced filament 18c is provided within the electrostatic field generated between the anode and cathode. In addition, however, a third electrode 100 is interposed between the anode 10 and cathode 12m in circumferential coaxial relation to the former electrode. This third electrode affords a number of distinct advantages which are not readily apparent.

To begin with, because of the closer proximity of the grid electrode 100 to the anode 10 than the proximity of cathode 12m thereto, the capacitance between said grid and anode is considerably larger than the capacitance that would exist in the system if it contained only the anode and cathode without the grid. It follows, therefore, that the electrical charge that can be stored on the grid-anode capacitor is substantially greater than could be stored on the cathode-anode capacitor without the grid. The circulating electron charge that can orbit in a stable condition about the anode is limited to approximately 50 to 75% of the bound charge on the capacitor; therefore, it follows that the grid-anode capacitor offers an opportunity for greatly increasing the number of circulating electrons that can orbit the anode with the attendant increase in ion pumping effect.

Quite obviously, this same increase in ion pumping capacity could be realized by decreasing the diameter of the cathode 12m to that of the grid electrode 100; however, to do so would bring about a very serious decrease in active gas pumping capacity. It is equally obvious that the anode diameter could be increased to increase the capacitance but this would seriously decrease the ion pumping effect by shortening the electron path and could also decrease the gas conductance of the device by obstructing the flow path. It must be remembered that a pump of this type is, in essence, two pumps having different functions and not always consistent. Specifically, these units must pump the chemically-active gases such as, for example, oxygen, nitrogen and hydrogen; but, in addition be able to rid the system of the chemically-inactive gases like xenon, krypton, neon, argon and helium. The active gases present no particular problem as they are readily trapped on a surface coated with a suitable gettering material such as titanium, with which they combine chemically. The atoms of the inactive gases, on the other hand, must be ionized by electron bombardment to produce positive ions which can then be driven into appropriate collecting surfaces and buried under a layer of freshly deposited getter material.

The inconsistencies arise because of the considerably greater volume of active gases that must be handled by the system in comparison to the inactive gases. A pump designed to handle large volumes of active gas, for the reasons aforementioned, will have a small ion pumping capability due to the reduced capacitance of a system having a cathode spaced far away from the anode. Conversely, an increase in ion pumping capacity resulting from moving the cathode in closer to the anode decreases the active gas conductance of the cathode as the cube of its diameter. This, obviously, is a serious limitation of the diode-type getter-ion pumps in which the solution involves a compromise between the active and inactive gas pumping capacities with both suffering a substantial decrease.

It is now possible through the use of the triode configuration shown in FIGURE 1 to retain the large diameter cathode 12m so necessary to a high active gas conductance and, at the same time, provide optimum inactive gas pumping capability through the use of high-capacitance grid-anode configurations. In this connection, it is important to point out that the radially-symmetric electrostatic field so necessary to the production of long average electron paths is achieved by using a hollow cylindrical grid electrode 100 encircling the anode in coaxial relation and is independent of the shape or location of the cathode relative to such a grid-anode system. In other words, while the apparatus of FIGURE 1 shows a cylindrical cathode 12m encircling the grid electrode 100 and anode 10 in coaxial relation to both and concentric relation to the grid, this is not necessary. If, for example, a system having increased ion-pumping capabilities were needed to balance a high active-gas pumping rate, a plurality of small grid-anode subassemblies could be grouped inside the cathode 12m and each of these smaller subassemblies would have a higher capacitance as well as higher ion-pumping capability by reason of the close proximity of the grid electrode to the anode. In addition, each of these subassemblies would require its own separate injector assembly, however, a single source of gettering material like that shown in FIGURE 11 located centrally with respect to the cathode to insure an even deposition thereof will suffice. As for the cathode 12m, its shape is immaterial insofar as the ion-pumping and active gas pumping capabilities are concerned except that all internal surfaces should open toward the source of getter material and be in a position to receive a fairly uniform coat thereof. An irregular surface would have the advantage of increased area but suffer from the disadvantages of being difficult to coat uniformly, the latter being easily accomplished on a cylindrical surface like that shown in FIGURE 1.

Figure 9:
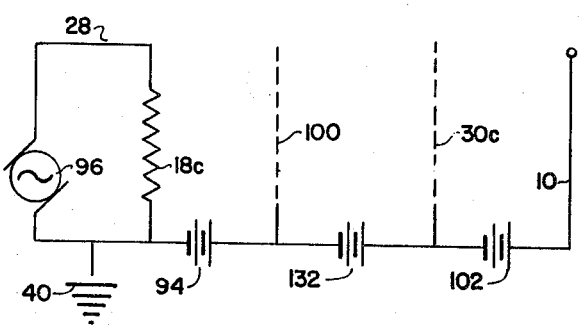
FIGURE 9 is an electrical schematic of the apparatus illustrated in FIGURES 1–4, inclusive.

Specifically with respect to the apparatus shown in FIGURES 1–4 and 9, the entire vacuum vessel is the same as that previously described. The grid-electrode 100 is of the open mesh type and is biased positive with respect to the cathode 12m which is at ground potential, the latter forming a wall of the vacuum vessel. The grid electrode 100 is connected as shown in FIGURE 9 to the positive side of D.C. power source 94. The bias current to the grid enters the vacuum vessel through connector 66, fastener 104 and ring 106.

Grid 100 together with end caps 20a form a cylindrical basket having flat circular meshed ends. The basket has metal rings 106 at both ends thereof spanned by braces 108 that constitute its frame. Each of the rings carries several insulators 110 that hold the cylindrical grid centered coaxially relative to the anode and in spaced relation to the cathode. Legs 111 having insulators 113 on their lower ends rest on the baseplate 40 and support the basket up inside the vacuum vessel. An opening 112 is provided in the bottom endcap 20a sized to pass the injector assembly 16c into the region between the grid and anode. Insulators 114 border this opening to keep the injector assembly out of contact with bottom endcap 20a and similar insulators 116 keep it from touching the grid electrode.

Injector unit 16c is somewhat directional in that filament 18c is mounted within a shield 118 that has a channel-shaped cross section opening more or less tangentially although the electrons issuing from the filament are, by no means, restricted to a narrow angle of egress. In fact, an examination of FIGURES 3 and 4 will show that the electrons may assume introductory orbits spread apart at least 120°. The important fact is that inside wall 120 of the shield 118 prevents any electrons from migrating directly to the anode as this wall is interposed between the anode and filament. Electrical lead 28 from A.C. generator 96 enters the vacuum chamber through insulated connector 90 and serially connects to the lower end of the filament. The upper end of the filament 18c is grounded to the baseplate 40 through shield 118.

A flat open accelerating grid 30c is positioned in front of the filament 18c on the open face of the shield 118 from which it is insulated by insulators 122. Flat accelerating grid 30c has solid plates 124 both top and bottom and the lower one attaches to leg 126 that rests on the baseplate 40 but is insulated therefrom by insulator 128. The bias current to the accelerating grid enters the vacuum chamber through connector 68 and lead 130 which cooperates with the leg 126 to support same.

Finally, with reference to the circuit diagram of FIGURE 9, it will be seen that filament 18c is biased at ground potential. Grid electrode 100, as already mentioned, is biased positively with respect to filament 18c by its connection to the positive terminal of D.C. source 94, whose negative terminal is connected to said filament. Likewise, accelerating grid 30c is biased positively with respect to the grid electrode 100 because the latter is connected to the negative side of D.C. source 132 while the former is wired to the positive side thereof. A still greater positive bias is applied to anode 10 by virtue of its connection to the positive side of D.C. source 102, the negative side being connected to the accelerating grid 30c. Thus, the grid electrode 100 is biased positively with respect to the filament 18c which is at ground potential, the accelerating grid 30c is biased positively with respect to both the filament and grid electrode, and the anode 10 is biased positively with respect to all three.

At the risk of some repetition, it is important to observe in FIGURE 1 that, once again, filament 18c is displaced axially to place a substantial portion thereof in lower end zone E where a substantial axially-directed force component exists that will act upon the electrons and cause them to spiral upwardly along the anode. This same axial displacement of the filament relative to the electrostatic field generated about the anode is common to all of the illustrated embodiments and is directly responsible for the highly desirable rosette-shaped helical orbits so necessary to achieve long electron paths and efficient ion-pumping.

In closing, a few general observations can be made which will become more meaningful in the light of the specific structural embodiments just described. First of all, the preferred method of injecting the electrons into the electrostatic field is to supply same with varying degrees of angular momenta and energy so that they will follow different orbital paths and avoid a space charge build-up in a relatively small volume. An omni-directional electron injection apparatus shielded to prevent emissions directly to the anode has proven superior to injectors having a measure of directivity even though slight.

Secondly, a substantial proportion of the electrons should be introduced in one of the end zones of the electrostatic field where substantial axially-directed forces exist which will start the electrons on spiralling orbits along the anode. Additional axial momenta may be imparted thereto by tilting the injection mechanism so that the electrons are introduced into the electrostatic field already possessing an axially-directed force vector tending to move them toward the central zone where the electrostatic forces are nearly all radial. In this same connection, reflectors at the ends of the anode-cathode or anode-grid capacitors are unnecessary provided the anode terminates short of the cathode or grid, if present; however, if reflectors are used in the form of endcaps, they are preferably symmetrical with respect to the anode although the caps on each end may be of different shapes.

Third, it is essential that the cathode provide a hollow cylindrical surface encircling the anode in coaxial relation to the latter when no grid electrode is used and the same requirements apply to the grid electrode in the triode configuration. In the latter embodiment, the shape of the cathode becomes of little significance insofar as the ion-pumping capabilities are concerned although it should provide a surface suitable to be coated with a getter material. In fact, the anode-grid capacitor needn't be located coaxially within the cathode but may, if desired, be placed anywhere within the envelope defined by the cathode which, of course, permits the use of more than one grid-anode subcombination to increase the ion-pumping capabilities of the apparatus in relation to the active-gas pumping capacity.

To maintain the cylindrical symmetry of the electrostatic field, it is desirable to keep the injector mechanism as small as possible. There are two reasons for this, namely, the hardware itself introduces asymmetries in the electrostatic field, and, secondly, it provides a physical structure that intercepts some of the orbiting electrons thus diminishing the average path length thereof.

The triode structure offers several other advantages in addition to those just mentioned. In a diode configuration, positive ions formed at a considerable distance from the anode lack the energy necessary to bury themselves in the wall of the cathode. On the other hand, in the triode structure, it becomes a simple matter to further accelerate all ions formed in the grid-anode region by means of the supplemental potential gradient existing between the grid and cathode.

Furthermore, a highly unstable space-charge exists around the anode at high electron densities and this oscillating space-charge phenomena can impart sufficient additional energy to some of the electrons to allow them to reach the cathode even though their initial energy level is such that this should not occur. If one attempts to measure the gas pressure by correlating same to the current to the cathode, such reading will be in error due to the increment of electron current. The triode structure provides a solution to this problem because the electrostatic field between the grid and cathode turns back any electrons able to escape the grid-anode region and the current measured at the cathode thus becomes a true measure of the gas pressure because this current represents only positive ions.

Having thus described the several useful and novel features of the ion-pumping method and apparatus of the instant invention, it will become immediately apparent that the several worthwhile objectives for which they were developed have been achieved. Although but a few specific embodiments of the invention have been illustrated and described herein, I realize that other configurations are likely to occur to those skilled in the art within the broad teaching hereof; hence, it is my intention that the scope of protection afforded hereby shall be limited only insofar as said limitations are expressly set forth in the appended claims.

What is claimed is:

1. An electrostatic electron orbiting device for use in a vacuum vessel having a port for the introduction of gas, said device being of the type including an elongate rod-like conductor forming a first electrode, a hollow substantially cylindrical conductor of the open grid type encircling the first conductor in coaxial relation thereto defining a second electrode, a source of electrical energy connected to said electrodes in a manner to bias the second negatively with respect to the first and establish an electrostatic field therebetween, said field having an elongate central zone intermediate the ends thereof wherein the electrostatic forces are essentially radially-directed and end regions abutting the central zone that include substantial axially-directed electrostatic forces of a magnitude capable of moving an electron released therein toward said central zone, a source of electrons positioned and adapted to introduce electrons into the electrostatic field between the electrodes with insufficient initial energy to reach the second electrode and with sufficient angular momentum such that a majority thereof cannot initially reach the first electrode, the source of electrons being disposed relative to the electrostatic field such that a substantial proportion of the electrons emitted thereby are released in one of the end regions where the axially-directed forces present in said regions will cause said electrons to follow rosette-shaped substantially helical orbital paths along the first electrode, and a third electrode which surrounds the second electrode in radially-spaced relation thereto, said third electrode being connected to the source of electrical energy and biased negatively with respect to both the first and second electrodes to thereby establish a further electrostatic field between said second and third electrodes, said further field tending to prevent the flow of electrons therethrough to the third electrode.

2. The improved electrostatic electron orbiting device as set forth in claim 1 in which: the source of electrons is of the omni-directional type adapted to emit in all directions, and in which a shield is interposed between said source and first electrode capable of intercepting those electrons which would otherwise strike the latter.

3. A device as in claim 2 where said electron source includes two coaxial tubular electron accelerating grids disposed around said filament.

4. A device as in claim 3 where the inner one of said two grids is biased positive with respect to said filament by said source of electrical energy.

5. A device as in claim 4 where the outer one of said two grids is biased positive with respect to said inner grid by said source of electrical energy.

6. The improved electrostatic electron orbiting device as set forth in claim 1 in which: the source of electrons includes a filament and a grid, said grid being connected to the source of electrical energy and biased thereby at a potential negative with respect to the first electrode and positive with respect to the second, and said grid being positioned relative to the filament such that the electrons emitted from the latter are initially directed into random orbital paths that by-pass the first electrode.

7. The improved electrostatic electron orbiting device as set forth in claim 1 in which: the source of electrons includes a filament and a grid, said grid being connected to the source of electrical energy and biased thereby at a potential negative with respect to the first electrode and positive with respect to the second, and said grid being positioned relative to the filament such that the electrons emitted from the latter are initially directed into divergent paths orbiting around the first electrode in the same direction while by-passing same.

8. The improved electrostatic electron orbiting device as set forth in claim 1 in which: the source of electrons includes a filament and a grid, said grid being connected to the source of electrical energy and biased thereby at a potential negative with respect to the first electrode and positive with respect to the second, and said grid being located relative to the filament such that the electrons emitted from the latter are supplied by said grid with an initial axially-directed component acting in a direction to supplement the axially-directed forces present in the electrostatic field.

9. The improved electrostatic electron orbiting device as set forth in claim 1 in which: the source of electrons is displaced axially toward adjacent ends of the electrodes and a substantial portion of said source is positioned outside the essentially radially-directed electrostatic field generated therebetween.

10. The improved electrostatic electron orbiting device as set forth in claim 1 in which: at least one end of the second electrode is open and the first electrode terminates short of said open end.

11. The improved electrostatic electron orbiting device as set forth in claim 1 in which: the source of electrons includes a filament positioned in spaced substantially parallel relation to the first electrode.

12. The improved electrostatic electron orbiting device as set forth in claim 1 in which: a source of gettering material is mounted on the first electrode.

13. The improved electrostatic electron orbiting device as set forth in claim 1 in which: the third electrode comprises a wall of an air-tight vacuum vessel.

14. The improved electrostatic electron orbiting device as set forth in claim 1 in which: the bias carried by the third electrode is sufficiently negative compared with the bias on the second electrode to prevent any electrons that have acquired sufficient additional energy to reach said second electrode from reaching the third.

15. The improved electrostatic electron orbiting device as set forth in claim 1 in which: the interior surface of the third electrode comprises a gettering material capable of trapping both active gas molecules and positive ions of inactive gases attracted thereto.

16. The improved electrostatic electron orbiting device as set forth in claim 12 in which: means for evaporating the gettering material is located in close proximity thereto, said means comprising a heated filament.

17. A device as in claim 1 including means for measuring the flow of ion current to said third electrode.

18. A device as in claim 1 where said source of electrons is positioned at one of the extremities of the device and is located completely outside the electrostatic field generated between the said first and second electrodes, said electron source imparting an initial axial component of velocity to the electrons before they enter the last-mentioned electrostatic field.

19. A device as in claim 18 where said electron source is housed in a cylindrical container that surrounds one of the ends of the said first electrode in coaxial relation thereto and is positioned adjacent said one extremity of the device whereby the injected electrons escape through an open end of said container into said electrostatic field between the first and second electrodes.

20. A device as in claim 1 where said source of electrons is positioned at the side of one end of the portions of said second electrode, said electron source spraying said electrons out in a cone from an opening at said side.

21. A device as in claim 20 where said electron source includes a filament and a grid, the spacing and the potential between said filament and said grid causing said cone of electrons to have a substantial width.

22. A device as in claim 1 where said source of electrons includes means for initially directing said electrons into divergent paths around said first electrode in the same direction.

23. A device as in claim 22 where said source of electrons includes (1) a filament positioned in said electrostatic field between the first and second electrodes and in spaced substantially parallel relation to the first electrode and (2) a shield having a substantially channel-shaped cross-section, said shield surrounding said filament and opening approximately tangentially to a radial from said first electrode.

24. An electrostatic electron orbiting device comprising:
means for creating a cylindrically symmetrical electrostatic field within the device;
means for injecting electrons into said electrostatic field with sufficient angular momentum to maintain them in orbit until they ionize a gas molecule; and
means for creating a second electric field surrounding the first and blocking the passage of electrons having sufficient energy to escape said first electrostatic field.

25. A device as in claim 24 including means for measuring the flow of said ionized gas molecules through said second electrostatic field.

26. The improved method of producing long electron orbital paths in an electrostatic field formed between an elongate central electrode and a cylindrical electrode biased negatively with respect to said central electrode and surrounding same in coaxial relation which comprises: discharging electrons into the electrostatic field with sufficient angular momentum to initially by-pass the central electrode and with insufficient energy to reach the cylindrical electrode, introducing said electrons in an axially-displaced region of said electrostatic field where the latter includes a substantial axially-directed force component operative to circulate said electrons into rosette-shaped generally helical orbits along and around said central electrode, and establishing a second electrostatic field surrounding the first which tends to block the passage of said electrons through said second field to the third electrode.

27. The improved method for removing inactive gases from a closed system which comprises: establishing a cylindrically-symmetrical electrostatic field within the system which includes a central zone of primarily radially-directed electrostatic forces and end regions having substantial axially-oriented forces adjoining said central zone, injecting electrons into an end region of said electrostatic field with sufficient angular momentum to cause same to enter rosette-shaped generally helical orbital paths extending axially thereof, establishing a second electrostatic field surrounding the first which tends to block the passage of said electrons through said second field to the third electrode, and collecting the ions produced by collision of the orbiting electrons with the inactive gas molecules.

28. The improved method for measuring the pressure in a closed system containing both active and inactive gases which comprises: establishing a cylindrically symmetrical electrostatic field within the system, injecting electrons into said electrostatic field with sufficient angular momentum to maintain them in orbit therein until they collide with a gas molecule and ionize same, establishing a second electrostatic field surrounding the first which tends to block the passage of electrons having sufficient energy to escape said first electrostatic field, and measuring the flow of ions through the second electrostatic field.

29. The ion pumping apparatus which comprises: an air-tight vacuum vessel having a port therein for the introduction of gas, an elongate rod-like conductor forming a first electrode, an open grid-type hollow cylindrical conductor encircling the first conductor in coaxial relation thereto defining a second electrode, a source of electrical energy connected to said electrodes in a manner to bias the second negatively with respect to the first and establish a first electrostatic field therebetween, electron injecting means positioned and adapted to introduce electrons into said first electrostatic field between the electrodes with insufficient initial energy to reach the second electrode and with sufficient angular momentum such that the majority thereof cannot reach the first electrode, and a hollow impervious conductor forming a third electrode having an interior gettering surface arranged in circumferentially-spaced relation around the second electrode, said third electrode being connected to the source of electrical energy and biased thereby negatively with respect to said second electrode, said first and second electrodes co-operating to establish a second electrostatic field encircling the first of said fields, and the bias on said third electrode being selected such as to prevent the entry into said second electrostatic field of electrons that have acquired sufficient additional energy to reach said second electrode.

30. The ion pumping apparatus as set forth in claim 29 in which: the third electrode comprises a wall of a vacuum vessel housing the other electrodes and the electron injecting means.

31. The ion pumping apparatus as set forth in claim 29 including means mounted on said first electrode for producing a gettering surface on the inside surface of said third conductor, the third electrode being provided with sufficient negative bias relative to the second electrode to accelerate the ions passing through the latter and bury same in the gettering surface.

32. The ion pumping apparatus as set forth in claim 29 in which: the first electrostatic field includes an elongated central zone wherein the electrostatic forces are primarily radial and end regions adjoining said central zone that include substantial axially-directed electrostatic forces, and in which the means for injecting the electrons is displaced axially so that a substantial proportion of the electrons emitted thereby are released in one of said end regions.

33. The ion pumping apparatus as set forth in claim 29 in which: the cylindrical surface of the second electrode lies closely adjacent the anode to increase the capacitance of the first electrostatic field and the resultant ion-pumping capacity, and in which the volume enveloped by the third electrode is large compared with that enveloped by said second electrode so as to provide substantial active gas capacity.

34. The ion pumping apparatus as set forth in claim 29 in which: both ends of the second electrode are cylindrically symmetrical with respect to the first electrode.

35. The ion pumping apparatus as set forth in claim 29 in which: the electron injecting means includes an omni-directional filament and a shield interposed between said filament and first electrode in position to prevent electrons from migrating directly to the latter.

36. The ion pumping apparatus as set forth in claim 29 in which: one end of said second electrode is open and shaped cylindrically symmetric with respect to said first electrode, and in which said first electrode terminates short of the open end of said second electrode.

37. The ion pumping apparatus as set forth in claim 29 in which: the electron injecting means includes a filament positioned in spaced substantially parallel relation to said first electrode.

References Cited

UNITED STATES PATENTS

| | | | |
|---|---|---|---|
| 3,244,969 | 4/1966 | Herb et al. | 230—69 X |
| 3,244,990 | 4/1966 | Herb et al. | 230—69 X |

ROBERT M. WALKER, *Primary Examiner.*